United States Patent Office 3,228,999
Patented Jan. 11, 1966

3,228,999
ALKOXY CARBONYL, AMINO CARBONYL AND CYANO DERIVATIVES OF ALKYL OR ARYL MERCAPTO, SULPHONO OR SULPHOXIDO ETHYL ESTERS OF THIO-PHOSPHORUS ACIDS
Hans-Gerd Schicke, Wuppertal-Elberfeld, Walter Lorenz, Wuppertal-Vohwinkel, and Gerhard Schrader, Wuppertal-Cronenberg, Germany, assignors to Farbenfabriken Bayer Aktiengesellschaft, Leverkusen, Germany, a corporation of Germany
No Drawing. Filed June 11, 1962, Ser. No. 201,319
16 Claims. (Cl. 260—940)

This application is a continuation-in-part of application Serial No. 83,888 now abandoned.

The present invention relates to and has as its objects new and useful insecticidal active phosphorus containing compounds and processes for the production thereof. These new compounds may be represented by the following general formula

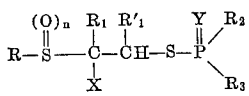

wherein R stands for alkyl or aryl radicals which may be substituted, $R_1$ and $R_1'$ are hydrogen or an alkyl radical, $R_2$ and $R_3$ stand for radicals which form together with the remaining molecular residue a derivative of a phosphoric, phosphonic or phosphinic acid (esters or amides), X stands for the nitrile radical, carboxylic acid ester radicals or carboxylic acid amide radicals, Y is oxygen or sulfur, and $n$ stands for 0, 1 or 2.

It is known that sulfenic acid chlorides can be added to α,β-unsaturated carboxylic acid derivatives thus forming α-halogeno-β-alkylmercapto-carboxylic acid derivatives (cf. K. D. Gundermann, R. Thomas, Ber. 89, 1263 [1956]; Ber. 92, 1503 [1959], H. Brinzinger, M. Langheck, Ber. 87, 325–329 [1954]).

In accordance with this invention it has now been found that in these compounds the halogen can be easily replaced by phosphoric acid radicals so that new phosphoric, phosphonic or phosphinic acid esters are formed having the above general formula.

According to the method described above, compounds are formed in which $n$ is 0, i.e. sulphides, provided $n$ is 1 or 2, the compounds may be obtained either from α-halo-sulphoxides or -sulphones, or alternatively, the sulphido esters ($n=0$) are subsequently oxidised with hydrogen peroxide, nitric acid, hypohalogenic acids or $KMnO_4$ or the like.

The above compounds are distinguished by a good insecticidal action, some by a systemic action, which render them suitable for plant protection.

Thus, according to the present process compounds are obtained from acrylic acid esters which may be substituted by the addition of alkyl- or aryl-sulphenyl halides (followed if necessary by oxidation), and subsequent exchange of the halogen for corresponding phosphoric, phosphonic or phosphinic acid esters or amides (or subsequent oxidation, if desired) according to the following scheme:

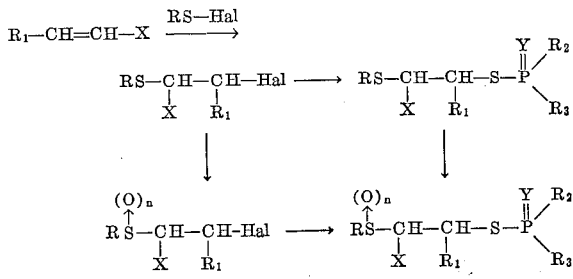

In the above formulae the symbols possess the aforesaid significance, but $n$ standing for 1 or 2.

The new esters of the present application are employed in a principally known manner. They are either mixed with solid or liquid carriers or diluents whereby further auxiliaries may be added to these mixtures such as emulsifiers or other known insecticides or fungicides. A preferred method of application is a mixture of the active substance with a solvent assistant and a commercial emulsifier, for example, based on a polyglycollized phenol and subsequent dilution of this mixture with water until the desired concentration is attained.

As an example for the special utility of the inventive compounds the ester of the following formulae

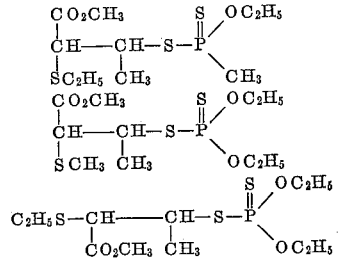

have been tested against aphids and spider mites. Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against aphids (species *Doralis fabae*). Heavily infested bean plants (*Vitia faba*) have been sprayed drip wet with solutions as prepared above in a concentration as shown below. The effect has been determined by evaluation after 24 hours by counting the dead pests either on the surface of the soil or still remaining on the plants. The following results have been obtained: Complete killing has been obtained with 0.001% solutions and with a solution of 0.0001% in the third case.

(b) Against spider mites (contact-insecticidal action). Bean plants (*Phaseolus vulgaris*) of about 15 inches height were sprayed drip wet with solutions as prepared above in a concentration as shown below. The bean plants have been infested heavily with the two-spotted spider (species *Tetraanychus telarius*). Evaluation has been carried out after 24 hours, 48 hours and 8 days. The following results have been obtained: Spider mites were killed completely with 0.01% solutions in the first two cases and with 0.0001% solutions in the third case.

The production of the compounds obtainable according to the invention may be illustrated by the following examples.

EXAMPLE 1

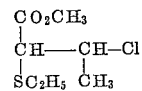

300 g. of crotonic acid methyl ester are dissolved in 300 cc. of carbon tetrachloride. 288 g. of ethyl sulphenyl chloride are added dropwise at −5 to −10° C. to 450 cc. of carbon tetrachloride, the reaction mixture is subsequently warmed to room temperature and allowed to stand overnight. After removal of the solvent, the residue is fractionated and 389 g. of a pale yellow oil are obtained. Yield 66%, B.P. 75° C./2 mm. Hg.

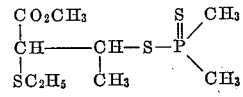

33 g. (0.2 mol) of dimethyl dithiophosphinic acid potassium salt are dissolved in 100 cc. of acetonitrile. A solution of 39 g. of α-chloro-β-ethylmercapto-butyric acid methyl ester in 100 cc. of acetonitrile are added dropwise at 70° C., the mixture is then heated at 80° C. for 2 hours, and, after cooling, the content of the flask poured into 1000 cc. of water. The separated oil is taken up with methylene chloride, washed with water and dried over sodium sulfate. Upon fractionation there are obtained 30 g. of a yellow oil of B.P. 104° C/0.01 mm. Hg. Yield 52%.

Systemic action with 0.1% solutions is 100%. Caterpillars are killed completely with 0.1% solutions.

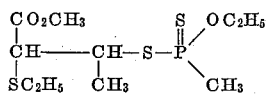

39 g. (0.2 mol) of α-chloro-β-ethylmercapto-butyric acid methyl ester are dissolved in 50 cc. of acetonitrile and added dropwise at 70° C. to a solution of 37 g. (0.2 mol) of methyl-phosphone-O-ethyl ester thionothiolic acid potassium salt in 100 cc. of acetonitrile. Stirring is continued for one hour at 80° C., and, after cooling, the content of the flask poured into 1000 cc. of water. The separated oil is taken up with methylene chloride and worked up in conventional manner.

Upon fractionation 34 g. of a yellow oil are obtained. Yield 56%, B.P. 108° C./0.01 mm. Hg.

Aphids are killed completely with 0.001% solutions. Spider mites are killed completely with 0.01% solutions.

EXAMPLE 2

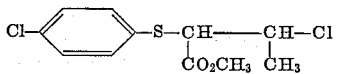

74 g. (0.5 mol) of p-chlorothiophenol are dissolved in 400 cc. of carbon tetrachloride. 71 g. of chlorine (100% excess) are introduced into the solution at 20–25° C. with stirring at 30–35° C. for one hour, and the excess chlorine is removed with the solvent in a vacuum. The dark colored residue of p-chloro-phenyl-sulfenyl chloride is dissolved in 200 cc. of carbon tetrachloride and added dropwise at 5° C. to a solution of 50 g. (0.5 mol) of crotonic acid methyl ester in 100 cc. of carbon tetrachloride. The temperature is raised to room temperature and stirring is continued for 24 hours. The solvent is then removed in a vacuum, and the residue fractionated. 88 g. of a yellow oil of B.P. 106° C./0.05 mm. Hg are obtained. Yield 63%.

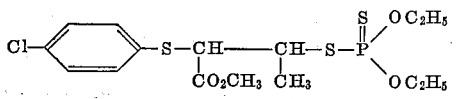

56 g. of α-chloro-β-(p-chlorophenyl)-mercapto-butyric acid methyl ester (0.2 mol) are dissolved in 100 cc. of acetonitrile and slowly treated at 70° C. with a solution of 41 g. of diethyl-dithiophosphoric acid ammonium salt in 150 cc. of acetonitrile.

The mixture is stirred at 80° C. for 2 hours, the precipitate ammonium chloride is filtered off after cooling, and the bulk of the solvent is removed in a vacuum. The residue is taken up in methylene chloride, washed with water and dried. After removal of the solvent, a yellow oil is obtained. If the product contains any unreacted starting material which cannot be removed by washing out or distillation, the substance is after-esterified at 80° C. for 2 hours with excess ammonium salt of diethyl-dithiophosphoric acid in acetonitrile. Yield 60 g. or 70%. Aphids and caterpillars are killed completely with 0.1% solutions.

EXAMPLE 3

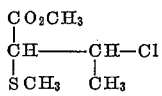

The preparation is carried out as described in the preceding examples. Yield 79%.

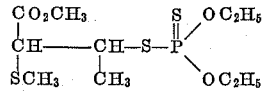

31 g. (0.15 mol) of diethyl-dithiophosphoric acid ammonium salt are dissolved in 100 cc. of acetonitrile. A solution of α-chloro-β-methylmercapto-butyric acid methyl ester in 50 cc. of acetonitrile is added at 60° C. with stirring. The mixture is heated at 80° C. for 2 hours, then cooled to room temperature and the content of the flask is poured into 150 cc. of water. The separated oily product is taken up with methylenechloride, washed with water and dried. Upon fractionation 26 g. of the new ester of B.P. 108° C./0.01 mm. Hg are obtained. Yield 52%.

Aphids are killed completely with 0.001% solutions. Spider mites are killed completely with 0.01% solutions.

In the same manner there may be obtained:

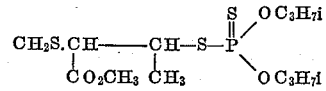

B.P. 110° C./0.01 mm. Hg.

Aphids are killed completely with 0.01% solutions.

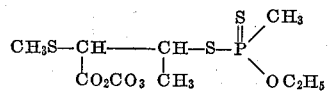

B.P. 109° C/0.05 mm. Hg.

Aphids are killed to 90% with 0.0001% solutions. Spider mites are killed to 40% with 0.001% solutions.

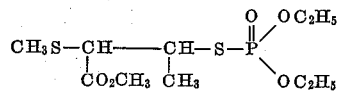

B.P. 119–120° C./0.05 mm. Hg.

Systemic action with 0.004% solutions is 100%. Spider mites are 90% killed with 0.004% solutions. Caterpillars are 70% killed with 0.02% solutions.

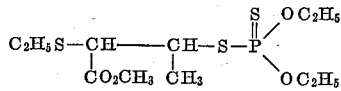

B.P. 115–116° C./0.3 mm. Hg.

Aphids and spider mites are completed killed with 0.0001% solutions. Caterpillars are 50% killed with 0.004% solutions.

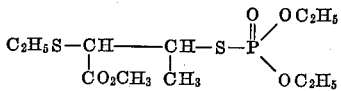

B.P. 110–111° C./0.01 mm. Hg.

Aphids are 90% killed with 0.001% solutions. Spider mites are 70% killed with solutions of 0.001%.

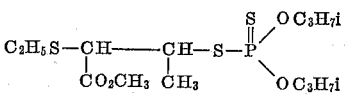

B.P. 121° C./0.01 mm. Hg.

Ahpids are completely killed with solutions of 0.01%. Systemic action with 0.1% solutions is 100%.

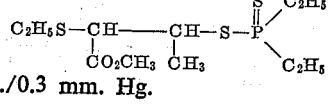

B.P. 129° C./0.3 mm. Hg.

Aphids are 90% killed with 0.001% solutions. Systemic action with 0.1% solutions is 100%. Caterpillars are completely killed with 0.1% solutions.

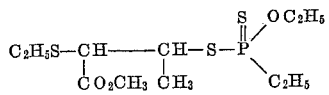

B.P. 120° C./0.15 mm. Hg.

Aphids are 95% killed with 0.001% solutions. Spider mites are 80% killed with 0.001% solutions. The compound shows an ovicidal action against the eggs of the red spider. Mosquito larvae are completely killed with 0.0001% solutions.

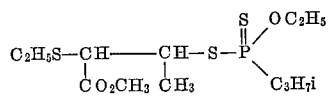

B.P. 128–130° C./0.2 mm. Hg.

Spider mites are completely killed with 0.1% solutions. The compound shows an ovicidal action against the eggs of the red spider. Aphids are 40% killed with 0.001% solutions.

EXAMPLE 4

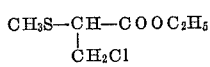

43 g. (0.46 mol) of dimethyl disulfide are dissolved in 150 ml. of petroleum ether. 59 g. (0.44 mol) of sulfuryl chloride are added dropwise at −10° C. in the course of 5–10 minutes. The mixture is stirred at −10° C. for 15 minutes, and a solution of 88 g. (0.88 mol) of acrylic acid ethyl ester in 100 ml. of petroleum ether is then added dropwise below 0° C. After stirring for a further hour, the hydrogen chloride and the petroleum ether are removed in a vacuum, and the residue is distilled; B.P. 67° C./2 mm. Hg, colorless oil, yield 74 g. corresponding to 46% of the theoretical.

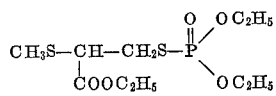

67 g. (0.33 mol) of diethyl-thiolphosphoric acid ammonium salt are dissolved in 300 ml. of n-propyl alcohol. 55 g. (0.3 mol) of β-methylmercapto-α-chloropropionic acid ethyl ester are added dropwise at 70–80° C. After stirring for one hour, the product is allowed to cool, 500 ml. of water are added, and the precipitated oil is taken up in ether. It is washed with a dilute sodium bicarbonate solution, dried over sodium sulfate and distilled; B.P. 97° C./0.01 mm. Hg, colorless to pale yellow oil. Yield 67 g. corresponding to 70.7% of the theoretical. On rats per os means toxicity 5 mg./kg.

Aphids are killed completely with 0.01% solutions. Systemic action with 0.1% solutions is 100%.

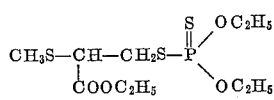

To a suspension of 38 g. (0.187 mol) of diethyldithiophosphoric acid ammonium salt in 100 ml. of acetone there are added dropwise 27 g. (0.15 mol) of β-methylmercapto-α-chloropropionic acid ethyl ester starting at a temperature of 20° C. The temperature slowly rises to 27° C. The mixture is heated at 60° C. for one hour, then poured into water, neutralised with sodium bicarbonate, and the oil is taken up in petroleum ether. It is washed with water, dried over sodium sulfate and distilled. A pale yellow oil is obtained of B.P. 105° C./0.01 mm. Hg. Yield 20 g. corresponding to 40.2% of the theoretical. On rats per os DL$_{50}$ 50 mg./kg.

Spider mites are killed completely with 0.01% solutions. Caterpillars are completely killed with solutions of 0.1%.

EXAMPLE 5

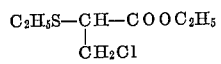

122 g. (1 mol) of diethyl disulfide are dissolved in 300 ml. of petroleum ether. 126 g. (0.93 mol) of sufuryl chloride are added dropwise at −20 to −10° C. in the course of one hour. The mixture is stirred at −10° C. for a further 15 minutes and a solution of 200 g. (2 mol) of acrylic acid ethyl ester in 200 cc. of petroleum ether are then added dropwise at about −10° C. within 3 hours. The reaction is strongly exothermic. After distilling off the solvent, the oil is taken up in petroleum ether, washed with a sodium bicarbonate solution, washed again until neutral, dried over sodium sulfate and distilled. A colorless oil of B.P. 85° C./3 mm. Hg is obtained. Yield 291 g. corresponding to 74% of the theoretical.

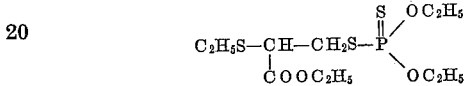

To a solution of 69 g. (0.34 mol) of diethyl dithiophosphoric acid ammonium salt in 200 ml. of n-propyl alcohol there are slowly added dropwise 59 g. (0.3 mol) of β-ethyl-mercapto-α-chloropropionic acid ethyl ester. The mixture is then slowly heated to 70–75° C. Within one hour, ammonium chloride thereby separates. After cooling, it is poured into 500 ml. of water and the oil is taken up in benzene. It is washed with a sodium bicarbonate solution until the wash water shows no reaction with a silver nitrate solution. The product is subsequently dried over sodium sulfate and distilled. B.P. 99° C./0.01 mm. Hg. Yield 91 g. corresponding to 87.6% of the theoretical. On rats per os means toxicity 100 mg./kg.

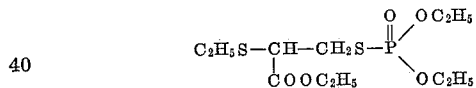

67 g. (0.33 mol) of diethyl-thiolphosphoric acid ammonium salt and 59 g. (0.3 mol) of β-ethylmercapto-α-chloro-propionic acid ethyl ester in 200 ml. of n-propyl alcohol are heated to 70–75° C. in the course of one hour. Ammonium chloride thereby separates. After cooling, the product is poured into 500 ml. of water, the oil taken up in benzene and washed several times with a sodium bicarbonate solution. After drying over sodium sulfate, the solvent is distilled off. The ester is distillable only in small portions and then boils at 101° C./0.01 mm. Hg. Yield 83 g. corresponding to 84% of the theoretical. On rats per os mean toxicity 5 mg./kg.

Aphids are completely killed with 0.001% solutions. Systemic action with 0.01% solutions is 100%.

EXAMPLE 6

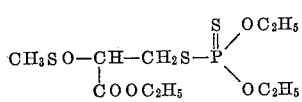

28 g. of the ester (0.084 mol) described in the preceeding Example 4 are dissolved in 100 ml. of methanol. After the addition of 0.5 ml. of 50% sulfuric acid, there is added dropwise at 40–45° C. with cooling the calculated amount of hydrogen peroxide. After completion of the oxidation, the product is poured into water, the oil taken up in benzene and washed neutral with water. After drying over sodium sulfate and distilling off the solvent, 25 g. of the ester are obtained as a nearly colorless oil. Yield 85.3% of the theoretical. On rats per os mean toxicity 100 mg./kg.

Aphids and spider mites are completely killed with 0.1% solutions.

If oxydation is carried out with KMnO₄ under usual conditions there is obtained the following sulfone:

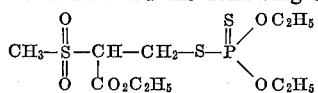

EXAMPLE 7

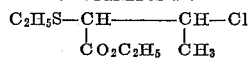

488 g. (4 mol) of diethyl-disulfide are dissolved in 150 cc. of carbon tetrachloride. At —5° C.—10° C. there are added dropwise to this solution 540 g. of sulfuryl-chloride and the reaction mixture is stirred for further 30 minutes. Thereafter the solution is added dropwise to 768 g. (8 mol) of ethyl-sulfenic-acid-chloride at about 0° C. and then added to 912 g. (8 mol) of crotonic-acid-ethyl-ester diluted in 500 cc. of carbon tetrachloride. Stirring is continued for about 1 to 2 hours until the sulfenic-acid-ester-chloride has become colorless, then the mixture is washed with water twice. Thereafter the residue is removed in vacuum and the solvent is dried and distilled off. There are obtained 1050 g. of α-ethyl-mercapto-β-chloro - butene - acid - ethyl - ester. Yield 63% of the theoretical. B.P. 98–100° C./6–7 mm. Hg.

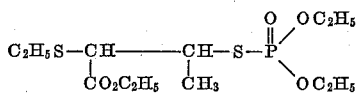

To a solution of 75 g. (0.4 mol) of 0,0-diethyl-thiol-phosphoric acid in 250 ml. of acetonitrile there are added dropwise at 70–80° C. 84 g. (0.4 mol) of α-ethylmercapto-β-chloro-buteric-acid-ethyl-ester. Thereafter the mixture is stirred for one hour and after cooling to room-temperature it is poured into 1000 cc. of water. The separated oil is taken up in methylene-chloride, the methylene-chloride-solution is washed with water and dried over sodium-sulfate. After evaporating of the solvent the oily residue is fractionated and distilled off. The 0,0-diethyl-thiol - S-(α-methyl-β-ethylmercapto-β-ethoxy - carbonyl-ethyl)-phosphoric acid ester boils at 134° C. under a pressure of 0.25. Yield 42% of the theoretical=58 g.

Aphids are 50% killed with 0.0001% solutions. Spider mites are 95% killed with 0.001% solutions. The compound shows an ovicidal action against the eggs of the red spider.

In the same manner there may be obtained:

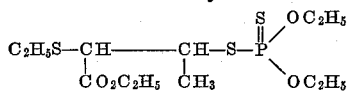

B.P. 134° C./0.2 mm. Hg.

Aphids are 90% killed with solutions of 0.001%. Spider mites are 40% killed with 0.001% solutions. The compound shows an ovicidal action against the eggs of the red spider.

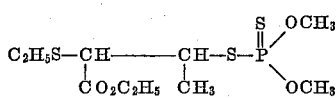

Spider mites are killed completely with 0.001% solutions. The compound shows an ovicidal action against the eggs of the red spider. Systemic action with 0.1% solutions is 100%. Mosquito larvae are killed completely with 0.0001% solutions.

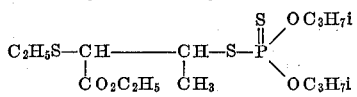

Caterpillars and spider mites are completely killed with 0.1% solutions.

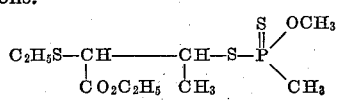

B.P. 130–132° C./0.3 mm. Hg.

Aphids are 40% killed with 0.001% solutions. Spider mites are completely killed with 0.01% solutions. The compound shows an ovicidal action against the eggs of the red spider. Mosquito larvae are completely killed with 0.0001% solutions.

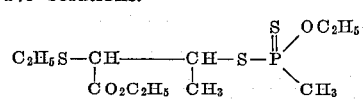

B.P. 124° C./0.1 mm. Hg.

Spider mites are completely killed with 0.001% solutions. The compound shows an ovicidal action against the eggs of the red spider. Aphids are 95% killed with solutions of 0.001%. Mosquito larvae are completely killed with 0.0001% solutions.

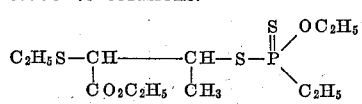

B.P. 127° C./0.1 mm. Hg.

Spider mites and aphids are 90% killed with 0.001% solutions. Mosquito larvae are 50% killed with 0.00001% solutions.

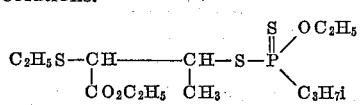

B.P. 130° C./0.1 mm. Hg.

Caterpillars are completely killed with 0.1% solutions. Aphids are 60% killed with 0.01% solutions.

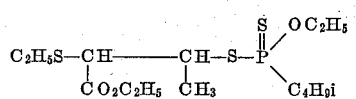

B.P. 136° C./0.8 mm. Hg.

Caterpillars are completely killed with 0.1% solutions. Spider mites are 60% killed with 0.01% solutions.

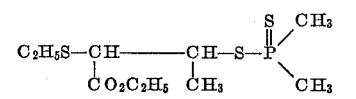

B.P. 154° C./0.8 mm. Hg.

Spider mites are completely killed with 0.01% solutions. Systemic action with 0.1% solutions is 100%.

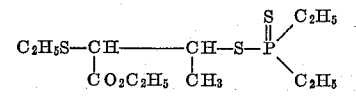

B.P. 152° C./0.6 mm. Hg.

Spider mites are 90% killed with 0.001% solutions. The compound shows an ovicidal action against the eggs of the red spider. Aphids are 30% killed with 0.001% solutions.

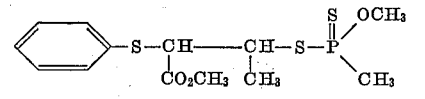

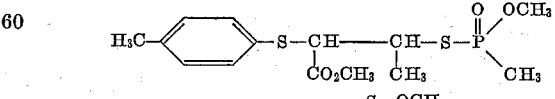

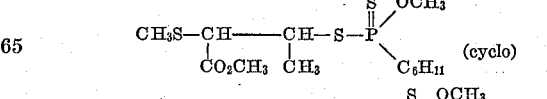

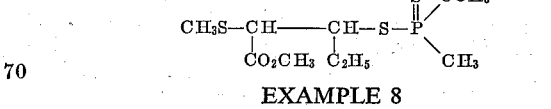

EXAMPLE 8

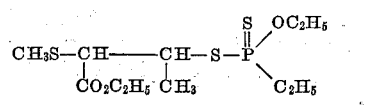

To a suspension of 63 g. (0.3 mol) of ethyl-thiono-phosphonic-O-ethyl-ester-thiol acid potassium salt in 250 cc. of acetonitrile there are added dropwise 59 g. (0.3 mol) of α-methyl-mercapto-β-chloro-butyric acid ethyl ester at 70–80° C. After working up the reaction mixture as described in the foregoing examples, 52 g. of ethyl-thiono - thiol - phosphonic-O-ethyl-S(α-methyl-β-methyl-mercapto - β - ethoxy-carbonyl-ethyl)-ester are obtained (53% of the theoretical). B.P. 126° C./0.15 mm. Hg.

In the same manner there may be obtained:

$$CH_3S-CH-CH-S-P\begin{smallmatrix}S\\||\end{smallmatrix}\begin{smallmatrix}OCH_3\\OCH_3\end{smallmatrix}$$
$$\quad\ \ |\qquad\quad |$$
$$\ \ CO_2C_2H_5\ \ CH_3$$

Spider mites are 40% killed with 0.001% solutions. The compound shows an ovicidal action against the eggs of the red spider. Caterpillars are completely killed with 0.1% solutions.

$$CH_3S-CH-CH-S-P\begin{smallmatrix}S\\||\end{smallmatrix}\begin{smallmatrix}OC_2H_5\\OC_2H_5\end{smallmatrix}$$
$$\quad\ \ |\qquad\quad |$$
$$\ \ CO_2C_2H_5\ \ CH_3$$

B.P 146° C./0.8 mm. Hg.

Spider mites are completely killed with 0.001% solutions. Aphids are 90% killed with 0.001% solutions.

$$CH_3S-CH-CH-S-P\begin{smallmatrix}S\\||\end{smallmatrix}\begin{smallmatrix}OC_3H_7i\\OC_3H_7i\end{smallmatrix}$$
$$\quad\ \ |\qquad\quad |$$
$$\ \ CO_2C_2H_5\ \ CH_3$$

Aphids are 60% killed with 0.01% solutions.

$$CH_3S-CH-CH-S-P\begin{smallmatrix}O\\||\end{smallmatrix}\begin{smallmatrix}OC_2H_5\\OC_2H_5\end{smallmatrix}$$
$$\quad\ \ |\qquad\quad |$$
$$\ \ CO_2C_2H_5\ \ CH_3$$

B.P. 136° C./0.4 mm. Hg.

Spider mites are 95% killed with 0.001% solutions. The compound shows an ovicidal action against the eggs of the red spider. Systemic action with 0.1% solutions is 100%.

$$CH_3S-CH-CH-S-P\begin{smallmatrix}S\\||\end{smallmatrix}\begin{smallmatrix}OCH_3\\CH_3\end{smallmatrix}$$
$$\quad\ \ |\qquad\quad |$$
$$\ \ CO_2C_2H_5\ \ CH_3$$

B.P. 134° C./0.5 mm. Hg.

Aphids are 70% killed with 0.001% solutions. Spider mites are 60% killed with solutions of 0.001%. The compound shows an ovicidal action against the eggs of the red spider. Mosquito larvae are completely killed with 0.00001% solutions.

$$CH_3S-CH-CH-S-P\begin{smallmatrix}S\\||\end{smallmatrix}\begin{smallmatrix}OC_2H_5\\CH_3\end{smallmatrix}$$
$$\quad\ \ |\qquad\quad |$$
$$\ \ CO_2C_2H_5\ \ CH_3$$

B.P. 126° C./0.3 mm. Hg.

Spider mites are 95% killed with 0.001% solutions. The compound shows an ovicidal action against the eggs of the red spider. Caterpillars are completely killed with 0.1% solutions.

$$CH_3S-CH-CH-S-P\begin{smallmatrix}S\\||\end{smallmatrix}\begin{smallmatrix}OC_2H_5\\C_3H_7i\end{smallmatrix}$$
$$\quad\ \ |\qquad\quad |$$
$$\ \ CO_2C_2H_5\ \ CH_3$$

B.P. 133° C./0.2 mm. Hg.

Caterpillars are completely killed with 0.1% solutions. Aphids are completely killed with 0.01% solutions.

$$CH_3S-CH-CH-S-P\begin{smallmatrix}S\\||\end{smallmatrix}\begin{smallmatrix}OC_2H_5\\C_4H_9i\end{smallmatrix}$$
$$\quad\ \ |\qquad\quad |$$
$$\ \ CO_2C_2H_5\ \ CH_3$$

B.P. 134° C./0.15 mm. Hg.

Aphids and caterpillars are completely killed with 0.1% solutions.

$$CH_3S-CH-CH-S-P\begin{smallmatrix}S\\||\end{smallmatrix}\begin{smallmatrix}OC_2H_5\\C_6H_5\end{smallmatrix}$$
$$\quad\ \ |\qquad\quad |$$
$$\ \ CO_2C_2H_5\ \ CH_3$$

Aphids are 80% killed with 0.001% solutions. Spider mites are 60% killed with 0.001% solutions. The compound shows an ovicidal action against the eggs of the red spider.

$$CH_3S-CH-CH-S-P\begin{smallmatrix}S\\||\end{smallmatrix}\begin{smallmatrix}CH_3\\CH_3\end{smallmatrix}$$
$$\quad\ \ |\qquad\quad |$$
$$\ \ CO_2C_2H_5\ \ CH_3$$

B.P. 156° C./1.3 mm. Hg.

Aphids are completely killed with 0.01% solutions. Spider mites are 40% killed with solutions of 0.001%. The compound shows an ovicidal action against the eggs of the red spider.

$$CH_3S-CH-CH-S-P\begin{smallmatrix}S\\||\end{smallmatrix}\begin{smallmatrix}C_2H_5\\C_2H_5\end{smallmatrix}$$
$$\quad\ \ |\qquad\quad |$$
$$\ \ CO_2C_2H_5\ \ CH_3$$

B.P. 146° C./0.4 mm. Hg.

Spider mites are 80% killed with 0.001% solutions. Systemic action with 0.1% solutions is 100%.

$$CH_3S-CH-CH-S-P\begin{smallmatrix}S\\||\end{smallmatrix}\begin{smallmatrix}CH_3\\C_6H_5\end{smallmatrix}$$
$$\quad\ \ |\qquad\quad |$$
$$\ \ CO_2C_2H_5\ \ CH_3$$

Spider mites are completely killed with 0.01% solutions. The compound shows an ovicidal action against the eggs of the red spider. Caterpillars are completely killed with solutions of 0.1%.

EXAMPLE 9

$$CH_3S-CH-CH_2-Cl$$
$$\qquad\ \ |$$
$$\quad\ \ CN$$

As described in Example 7 a suspension of 820 g. (10 mol) of methyl-sulfenic-acid-chloride in 500 cc. of carbon tetrachloride is made out of 470 g. (5 mol) of di-methyl-disulfide and 675 g. of sulfuryl-chloride. At 20° C. this suspension is added dropwise into 530 g. (10 mol) of acrylic acid nitrile diluted in 300 cc. of carbon tetrachloride. At 20° C. the reaction-mixture is stirred for 2 hours, then it is washed with water and the organic phase is dried and after evaporating the solvent the residue is fractionated. There are obtained 995 g. (73% of the theoretical) of α-methylmercapto-β-chloro-propionic-acid-nitrile-ester. B.P. 84–90° C./5–6 mm. Hg.

$$CH_3S-CH-CH_2-S-P\begin{smallmatrix}S\\||\end{smallmatrix}\begin{smallmatrix}OC_2H_5\\C_2H_5\end{smallmatrix}$$
$$\quad\ \ |$$
$$\quad\ \ CN$$

84 g. (0.4 mol) of the potassium salt of ethyl-thionophosphon-O-ethyl-ester-thiol in 250 cc. of acetonitrile are suspended and at 70–80° C. there are added to this solution 54 g. of α-methylmercapto-β-chloro-propionic-acid-nitrile, then the mixture is stirred at 70–80° C. for one hour and after cooling it down to 20° C. it is poured into water. The separated oil is taken up in methylene-chloride, the methylene-chloride-solution is washed with water, then dried over sodium-sulfate and the solvent is distilled off. The residue is obtained at a bath-temperature of 100° C. Yield of ethyl-thiono-thiol-phosphonic-acid-O-ethyl-S-(β-methylmercapto-β-cyano-ethyl)-ester is 82 g.=76% of the theoretical. B.P. 100° C./0.01 mm. Hg.

*Analysis* (mol 269).—Calculated: P, 11.52%; N, 5.21%. Found: P, 11.22%; N, 5.23%.

In the same manner there may be obtained:

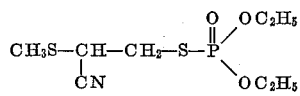

Aphids are 60% killed with 0.01% solutions. Spider mites are 95% killed with 0.01% solutions.

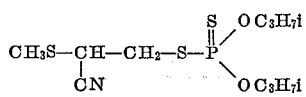

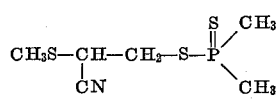

Systemic action with 0.1% solutions is 100%.

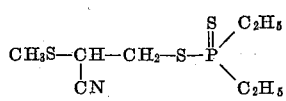

Spider mites are 95% killed with 0.01% solutions. Systemic action with 0.1% solutions is 100%.

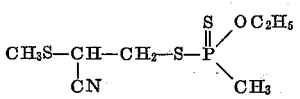

Spider mites are 80% killed with 0.01% solutions. The compound shows an ovicidal action against the eggs of the red spider. Caterpillars are completely killed with 0.1% solutions.

Also in high-vacuum the above mentioned substances cannot be distilled without decomposition.

EXAMPLE 10

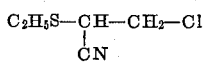

In the same manner as described in Example 9 there may be obtained from 530 g. of acrylic-acid-nitrile and 960 g. (10 mol) of ethyl-sulfenic-acid-chloride 910 g. (61% of the theoretical) of α-ethyl-mercapto-β-chloro-propionic-acid-nitrile. B.P. 92–94° C./6 mm. Hg.

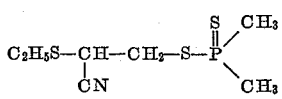

To a suspension of 49 g. of the potassium salt of dimethyl-thiono-thiol-phosphin (0.3 mol) in 250 cc. of acetonitrile there are added dropwise 45 g. (0.3 mol) of α-ethyl-mercapto-β-chloro-propionic-acid-nitrile at 70–80° C., then the mixture is stirred for one hour and worked up as described in Example 9. After removing the volatile parts at a bath-temperature of 100° C., 50 g. of dimethyl-thiono-thiol-phosphinic-acid-S-(β-ethyl-mercapto-β-cyano-ethyl)-ester are obtained which are 70% of the theoretical.

*Analysis* (mol 239).—Calculated: P, 12.98%; S, 40.02%; N, 5.86%. Found: P, 12.98%; S, 38.87%; N, 5.22%.

In the same manner there may be obtained the following compounds:

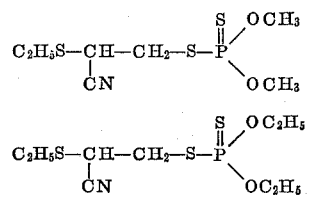

Aphids are 40% killed with 0.01% solutions. Spider mites are 70% killed with 0.01% solutions.

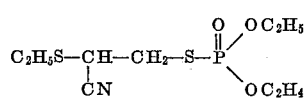

Spider mites are completely killed with 0.01% solutions. The compound shows an ovicidal action against the eggs of the red spider. Systemic action with 0.1% solutions is 100%.

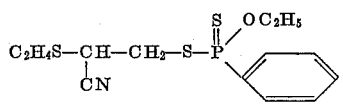

Caterpillars are completely killed with 0.1% solutions. Also in high-vacuum the aforementioned products cannot be distilled without decomposition.

EXAMPLE 11

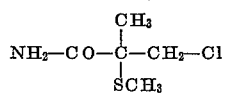

85 g. (1 mol) of methacryl acid amide are suspended in 500 cc. of carbon-tetrachloride. To this suspension there is added dropwise at 10–20° C. a solution of 82 g. of methyl-sulfenic-acid-ester-chloride (1 mol) in 300 cc. of carbon tetrachloride and then the mixture is stirred for one hour. During the reaction two layers are formed. Irrespective of this the carbon tetrachloride is distilled off. There are obtained 160 g. of α-methylmercapto-β-chloro-propionic-acid-amide as a brown syrupy residue, which is suitable for further decompositions.

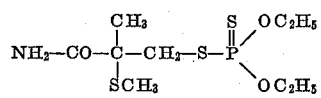

35 g. (0.2 mol) of the crude product produced in aforesaid manner of α-methyl-α-methylmercapto-β-chloro-propionic acid amide are suspended in 150 cc. of methyl-ethyl-ketone. Then it is filtered off from small quantities of unsuspended parts and the amide is added dropwise at 70–80° C. to a suspension of 41 g. (0.2 mol) of O,O-diethyl-thionothiol-phosphoric acid ammonium salt in 150 cc. of methyl-ethyl-kentone, then the mixture is stirred for one hour at 70–80° C., the separated ammonium chloride is sucked off and the solvent is removed in vacuum to a great extent. Then the residue is suspended in methylene-chloride, the methylene-chloride solution is washed with a little water, it is dried and the solvent is distilled off. After standing the residue solidifies crystalline. By recrystallisation from a ligroin-benzene-mixture there is obtained O,O - diethyl-thiono-thiol-phosphoric-acid-S-(β-methyl—mercapto - β - amino-carbonyl-propyl)-ester as a colorless crystal. Yield 42 g.=66% of the theoretical. B.P. 84–86° C.

In the same manner there may be obtained the following compounds:

5 mm. Hg. at 76 to 78° C. Yield: 323 g. (88.5% of the theoretical).

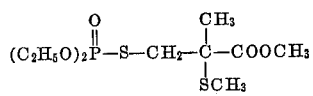

| Structure | Analysis | M.P., °C |
|---|---|---|
| NH₂·CO—C(CH₃)(SCH₃)—CH₂—S—P(=S)(OCH₃)₂ | Calculated: P, 10.72% <br> Found: P, 9.89% | |
| NH₂—CO—C(CH₃)(SCH₃)—CH₂—S—P(=S)(OC₃H₇i)₂ | Calculated: P, 8.98% <br> Found: P, 8.71% | |
| NH₂—CO—C(CH₃)(SCH₃)—CH₂—S—P(=O)(OC₂H₅)₂ | Calculated: P, 10.3% <br> Found: P, 10.2% | |
| NH₂CO—C(CH₃)(SCH₃)—CH₂—S—P(=S)(OCH₃)(CH₃) | | |
| NH₂—CO—C(CH₃)(SCH₃)—CH₂—S—P(=S)(CH₃)₂ | Calculated: P, 12.06% <br> Found: P, 12.47% | 114–115 |
| NH₂—CO—C(CH₃)(SCH₃)—CH₂—S—P(=O)(OCH₃)₂ | Calculated: P, 11.36% <br> Found: P, 10.98% | 84–58 |
| NH₂—CO—C(CH₃)(SCH₃)—CH₂—S—P(=S)(OC₂H₅)(CH₃) | Calculated: P, 11.29% <br> Found: P, 10.97% | |
| NHCH₃—CO—CH(SCH₃)—CH₂—S—P(=S)(OC₂H₅)₂ | | |
| N(CH₃)₂—CO—CH(SCH₃)—CH(CH₃)—S—P(=S)(OC₂H₅)₂ | | |
| N(C₂H₅)₂—CO—C(CH₃)(SCH₃)—CH₂—S—P(=S)(OC₂H₅)₂ | | |

EXAMPLE 12

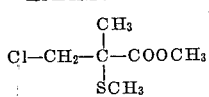

To a solution of 200 g. (2 mol) of methacrylic acid methyl-ester in 500 cc. of carbon tetrachloride there are added dropwise at 15 to 20° C. 165 g. (2 mol) of methylsulphenic acid chloride, dissolved in 500 cc. of carbon tetrachloride, and the mixture is subsequently stirred for another 30 minutes at 20° C. The reddish colour of the sulphenic acid chloride has then disappeared. The reaction mixture is then washed with water, dried, the solvent evaporated and the residue subjected to fractional distillation. The α - methyl-α-methylmercapto-β-chloropropionic acid methyl ester boils under a pressure of 47 g. (0.25 mol) of O,O-diethylthiolphosphoric acid ammonium salt are dissolved in 250 cc. of acetonitrile. 45.6 g. (0.2 mol) of α-methyl-α-methylmercapto-β-chloropropionic acid methyl ester are added dropwise at 70 to 80° C. to this solution, the mixture is subsequently stirred for about another hour at the above temperature, then cooled to room temperature and the precipitated salts are filtered off with suction. The solvent is removed under vacuum, the residue taken up in methylene chloride, the methylene chloride solution washed with a little water and dried over sodium sulphate. Thereafter, the methylene chloride is dstilled off and the residue subjected to fractional distillation. B.P. 127 to 129° C./0.15 mm. Hg. Yield: 50 g. (63% of the theoretical) of O,O-diethyl-S-(2-methylmercapto - 2 - methoxycarbonylpropyl)-thiolphosphoric acid ester.

*Analysis.*—Calculated for a molecular weight of 316: P, 9.82%; S, 20.25%. Found: P, 9.80%; S, 20.64%.

In an analogous manner as described in Example 12 the following compounds can be prepared:

| Constitution | Boiling point (° C.) | Pressure (mm. Hg) |
|---|---|---|
| $(C_2H_5O)_2\overset{S}{\overset{\|}{P}}-S-CH_2-\underset{SCH_3}{\overset{CH_3}{\underset{\|}{\overset{\|}{C}}}}-COOCH_3$ | 142 | 0.4 |
| $\underset{C_2H_5O}{\overset{C_2H_5}{\diagdown}}\overset{S}{\overset{\|}{P}}-S-CH_2-\underset{SCH_3}{\overset{CH_3}{\underset{\|}{\overset{\|}{C}}}}-COOCH_3$ | 126 | 0.1 |
| $\underset{CH_3}{\overset{C_2H_5O}{\diagdown}}\overset{S}{\overset{\|}{P}}-S-CH_2-\underset{SCH_3}{\overset{CH_3}{\underset{\|}{\overset{\|}{C}}}}-COOCH_3$ | 128 | 0.05 |
| $\underset{CH_3}{\overset{CH_3}{\diagdown}}\overset{S}{\overset{\|}{P}}-S-CH_2-\underset{SCH_3}{\overset{CH_3}{\underset{\|}{\overset{\|}{C}}}}-COOCH_3$ | 142 | 0.6 |
| $(CH_3O)_2\overset{S}{\overset{\|}{P}}-S-CH_2-\underset{SCH_3}{\overset{CH_3}{\underset{\|}{\overset{\|}{C}}}}-COOCH_3$ | Not distillable without decomposition | |

*Analysis.*—Calculated for a molecular weight of 304: P, 10.2%; S, 31.6%. Found: P, 10.12%; S, 31.37%.

EXAMPLE 13

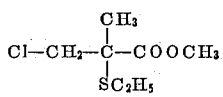

The preparation of the α-methyl-α-ethylmercapto-β-chloropropionic acid methyl ester is carried out as described in Example 12. Yield: 91% of the theoretical. B.P. 84° C./4 mm. Hg.

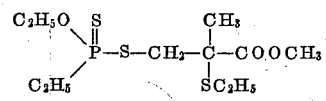

To a solution of 52 g. (0.25 mol) of ethyl-O-ethyl-thiono-thiolphosphonic acid potassium salt in 250 cc. of acetonitrile there are added dropwise at 70 to 80° C. 49 g. of α-methyl-α-ethylmercapto-α-chloropropionic acid methyl ester, the reaction mixture is subsequently stirred for another hour at 70 to 80° C., then cooled to room temperature and finally poured into water. The separated oil is taken up in methylene chloride and the methylene chloride solution dried over sodium sulphate. After evaporation of the solvent the ethylthionothiolphosphonic acid-O-ethyl-S-(2-ethylmercapto - 2 - methoxycarbonyl-propyl) ester is obtained in form of a yellow oil of B.P. 128 to 130° C./0.07 mm. Hg. Yield: 60 g. (73% of the theoretical).

*Analysis.*—Calculated for a molecular weight of 330: P, 9.40%; S, 29.1%. Found: P, 9.66%; S, 29.25%.

The following compounds can be prepared in a corresponding manner:

| Constitution | Analysis | B.P.[1] |
|---|---|---|
| $(CH_3O)_2\overset{O}{\overset{\|}{P}}-S-CH_2-\underset{SC_2H_5}{\overset{CH_3}{\underset{\|}{\overset{\|}{C}}}}-COOCH_3$ | Calculated: P, 10.25% <br> Found: P, 9.90% | |
| $(CH_3O)_2-\overset{S}{\overset{\|}{P}}-S-CH_2-\underset{SC_2H_5}{\overset{CH_3}{\underset{\|}{\overset{\|}{C}}}}-COOCH_3$ | Calculated: P, 9.75% <br> Found: P, 9.07% | |
| $(C_2H_5O)_2\overset{O}{\overset{\|}{P}}-S-CH_2-\underset{SC_2H_5}{\overset{CH_3}{\underset{\|}{\overset{\|}{C}}}}-COOCH_3$ | Calculated: P, 9.21% <br> Found: P, 9.27% | 140° C./0.25 mm. Hg |
| $(C_2H_5O)_2\overset{S}{\overset{\|}{P}}-S-CH_2-\underset{SC_2H_5}{\overset{CH_3}{\underset{\|}{\overset{\|}{C}}}}-COOCH_3$ | Calculated: P, 8.96% <br> Found: P, 9.53% | |
| $\underset{\phi}{\overset{C_2H_5O}{\diagdown}}\overset{S}{\overset{\|}{P}}-S-CH_2-\underset{SC_2H_5}{\overset{CH_3}{\underset{\|}{\overset{\|}{C}}}}-COOCH_3$ | Calculated: P, 8.2% <br> Found: P, 8.43% | |

[1] Some of the products are distillable only with decomposition even in a high vacuum.

EXAMPLE 14

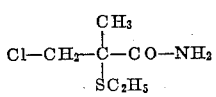

In a manner analogous to that described in Example 11, α-methyl-α-ethylmercapto-β-chloropropionic acid amide can be obtained in a yield of 80% of the theoretical by reaction of methacrylic acid amide and ethylsulphenic acid chloride.

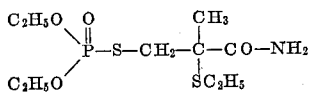

46.7 g. (0.25 mol) of O,O-diethylthiolphosphoric acid ammonium salt are dissolved in 200 cc. of acetonitrile. 45.5 g. of α-methyl-α-ethylmercapto-β-chloropropionic acid amide, dissolved in 100 cc. of acetonitrile, are added dropwise to this solution at 70 to 80° C., the mixture is stirred for another hour at the temperature indicated above, then cooled to 20° C. and the precipitated ammonium chloride filtered off with suction. Subsequently, the acetonitrile is evaporated under vacuum and the oily residue is taken up in methylene chloride. The methylene chloride solution obtained is washed with a little water and dried over sodium sulphate. After the solvent has been distilled off, 67 g. (85% of the theoretical) of the O,O-diethylthiol-phosphoric acid-S-(2-ethylmercapto-2-amino-carbonyl-propyl)-ester are obtained in form of a pale-yellow oil.

*Analysis.*—Calculated for a molecular weight of 315: P, 9.85%; N, 4.45%. Found: P, 10.29%; N, 4.58%.

The following compounds can be prepared in an analogous manner:

| Constitution | Analysis | M.P., °C. |
|---|---|---|
| $CH_3O$–$P(O)(OCH_3)$–$S$–$CH_2$–$C(CH_3)(SC_2H_5)$–$CO$–$NH_2$ | Calculated: P, 10.8%<br>Found: P, 11.53% | |
| $CH_3O$–$P(S)(OCH_3)$–$S$–$CH_2$–$C(CH_3)(SC_2H_5)$–$CO$–$NH_2$ | Calculated: P, 10.23%<br>Found: P, 9.92% | |
| $C_2H_5O$–$P(S)(OC_2H_5)$–$S$–$CH_2$–$C(CH_3)(SC_2H_5)$–$CO$–$NH_2$ | Calculated: P, 9.37%<br>Found: P, 9.55% | 68–70 |
| $C_2H_5O$–$P(S)(C_2H_5)$–$S$–$CH_2$–$C(CH_3)(SC_2H_5)$–$CO$–$NH_2$ | Calculated: P, 9.85%<br>Found: P, 10.66% | |
| $C_2H_5O$–$P(S)(C_6H_5)$–$S$–$CH_2$–$C(CH_3)(SC_2H_5)$–$CO$–$NH_2$ | Calculated: P, 8.57%<br>Found: P, 8.95% | |
| $CH_3$–$P(S)(CH_3)$–$S$–$CH_2$–$C(CH_3)(SC_2H_5)$–$CO$–$NH_2$ | Calculated: P, 11.42%<br>Found: P, 11.73% | 81 |

We claim:

1. A compound of the formula

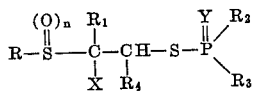

in which:
R stands for a member selected from the group consisting of lower alkyl having up to 4 carbon atoms, phenyl, chloro substituted phenyl and lower alkyl substituted phenyl wherein the alkyl substituent has up to 4 carbon atoms, $R_1$ and $R_4$ both stand for a member selected from the group consisting of hydrogen and lower alkyl having up to 4 carbon atoms, $R_2$ and $R_3$ stand for a member selected from the group consisting of lower alkyl having up to 4 carbon atoms, lower alkoxy having up to 4 carbon atoms, cyclohexyl and phenyl, X stands for a member selected from the group consisting of lower alkoxy carbonyl, said lower alkoxy having up to 4 carbon atoms, primary amino carbonyl and cyano, Y stands for a member selected from the group consisting of oxygen and sulfur and n stands for an integer of from 0 to 2.

2. A compound according to claim 1 wherin R is lower alkyl, $R_1$ is hydrogen, X is lower alkoxy carbonyl, $R_4$ is hydrogen, Y is sulfur, $n$ is zero and $R_2$ and $R_3$ are each lower alkoxy.

3. A compound according to claim 1 wherein R is lower alkyl, $R_1$ is hydrogen, X is lower alkoxy carbonyl, $R_4$ is lower alkyl, Y is sulfur, $n$ is zero, $R_2$ is lower alkyl and $R_3$ is lower alkoxy.

4. A compound according to claim 1 wherein R is lower alkyl, $R_1$ is hydrogen, X is lower alkoxy carbonyl, $R_4$ is lower alkyl, Y is sulfur, $n$ is zero and $R_2$ and $R_3$ are each lower alkoxy.

5. The compound of the following formula

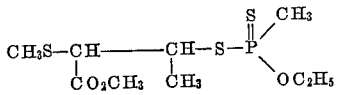

6. The compound of the following formula

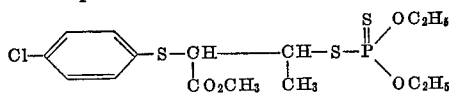

7. The compound of the following formula

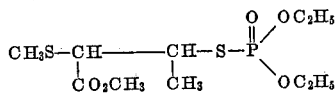

8. The compound of the following formula

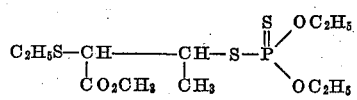

9. The compound of the following formula

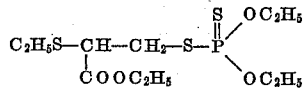

10. The compound of the following formula

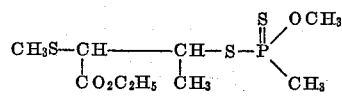

11. The compound of the following formula

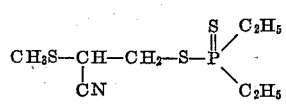

12. The compound of the following formula

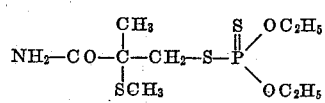

13. The compound of the following formula

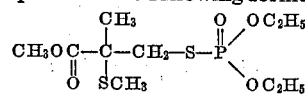

14. The compound of the following formula

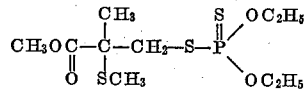

15. The compound of the following formula

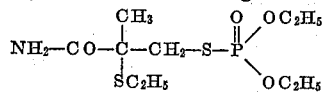

16. The compound of the following formula

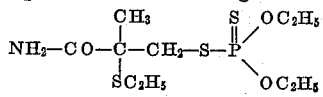

References Cited by the Examiner

UNITED STATES PATENTS 2,815,312 12/1957 Schuler _____ 260—461
2,963,505 12/1960 Muhlmann et al. _____ 260—461

FOREIGN PATENTS 1,068,699 11/1959 Germany.

CHARLES B. PARKER, *Primary Examiner.*

MORRIS LIEBMAN, IRVING MARCUS, *Examiners.*